June 4, 1940.  A. L. PARKER  2,202,960
VALVE ASSEMBLY
Filed Sept. 2, 1937
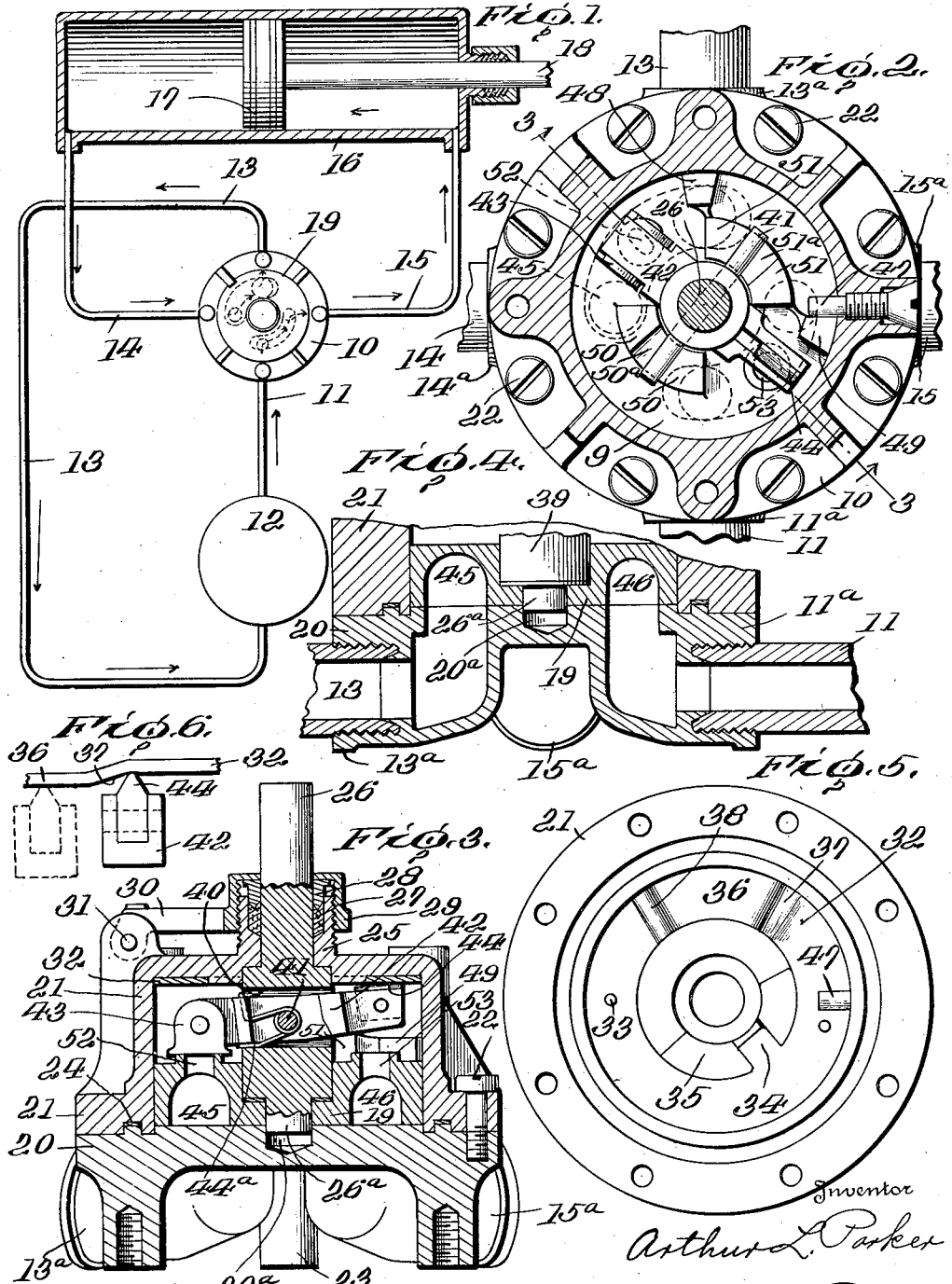
Inventor
Arthur L. Parker
By Mason & Porter
Attorneys Patented June 4, 1940

2,202,960

UNITED STATES PATENT OFFICE 2,202,960

VALVE ASSEMBLY

Arthur L. Parker, Cleveland, Ohio

Application September 2, 1937, Serial No. 162,207

17 Claims. (Cl. 121—46.5)

The present invention relates to new and useful improvements in a valve assembly and more particularly to improvements in a valve for controlling the flow of fluid under pressure.

An object of the invention is to provide a valve assembly wherein the pressure of the fluid is used to assist in maintaining the valve tightly seated when in predetermined set positions.

A further object of the invention is to provide a valve assembly of the above type, wherein the fluid pressure operating to maintain the valve tightly seated may be released to facilitate the shifting of the valve.

A still further object of the invention is to provide a valve assembly of the above type, wherein the valve actuating means operates to release the fluid pressure tending to seal the valve prior to the shifting of the valve and to restore the seating pressure when the valve has been shifted to another predetermined position.

The invention still further aims to provide a valve assembly for use with a reciprocating piston motor or the like, wherein the valve operates to selectively direct fluid under pressure to either end of the motor or to both ends of the motor so as to stop the piston in any desired position during its reciprocation.

The above and other objects of the invention will in part be obvious and will be hereinafter more fully pointed out.

In the drawing:

Figure 1 is a diagrammatic view showing the valve of the present invention connected to a closed fluid pressure system;

Fig. 2 is a plan view of the valve assembly with a portion of the valve housing in section;

Fig. 3 is a sectional view of the valve assembly taken along the line 3—3 of Fig. 2;

Fig. 4 is a fragmentary sectional view of the valve assembly taken along the line 4—4 of Fig. 2;

Fig. 5 is a bottom plan view of the valve housing with the valve member removed, and Fig. 6 is a fragmentary detail showing the cam means for operating a part of the valve mechanism when the valve stem is turned.

The present invention is particularly concerned with a valve assembly for controlling a reciprocating piston or the like, which is adapted to operate a remotely situated mechanism. For instance, the piston may be used to actuate the steering or leveling devices on airplanes, but it is to be clearly understood that the invention is not limited to such use but is equally well adapted for use in various other instances where a reciprocating piston or the like is used. The valve assembly of the present invention is employed in a closed fluid system wherein the fluid is maintained under pressure by means of a rotary pump or the like. The valve operates to afford communication between the fluid under pressure and either side or both sides of a reciprocating piston operating within a cylinder so as to accurately control movement of the piston in either direction.

Referring more in detail to the accompanying drawing, there is shown, in Figure 1, a diagrammatic view of the closed fluid pressure system. The valve casing 10 is in communication with an inlet supply conduit 11 which is connected to the outlet from a rotary pump 12. The valve casing 10 is also in communication with an exhaust or return conduit 13 which is connected to the inlet of the pump 12. Between the conduits 11, 13 are diametrically opposed conduits 14, 15, leading from the valve casing 10 to opposite ends of a cylinder 16, in which a piston 17 is mounted for reciprocation. The rod 18 of the piston may be connected to any operating mechanism for actuating the same. The valve member 19 in the form of a disk which is mounted in the casing 10, is adapted to control the passage of fluid under pressure from the pump 12. When the valve 19 is in one position, communication is afforded between the conduits 11 and 15 and between the conduits 14 and 13, so that the fluid under pressure is directed from the conduit 11 through the valve to the conduit 15 and thence to one end of the cylinder 16, thus causing movement of the piston 17 to the left, as in Figure 1. Movement of the piston 17 in this direction will cause fluid at the opposite end of the cylinder 16 to flow into the conduit 14, through the valve and thence through the conduit 13 back to the pump 12. Reversal of the valve member 19 will afford communication between the conduits 11 and 14 and between the conduits 15 and 13, so that fluid under pressure will be directed from the conduit 11 through the valve to the conduit 14 and thence into the opposite end of the cylinder 16, thus causing movement of the piston 17 to the right, as in Figure 1. This movement of the piston 17 will force fluid at the opposite end of cylinder 16 into the conduit 15 through the valve and conduit 13 back to the pump 12. Thus, by manipulation of the valve member 19, the direction of movement of the piston 17 may be determined at will. Provision is also made for the by-passing of fluid through the valve from the high to the low-pressure side of the fluid system, as will be hereinafter explained, so as to balance the fluid pressure on opposite sides of the piston 17. In this manner the piston 17 may be moved through small increments of its stroke, stopped and caused to remain in any desired intermediate position.

The details of one form of valve assembly are shown for purposes of illustration in Figures 2 through 5 of the accompanying drawing. The valve casing 10 includes a body portion 20 and a cap or housing 21 which is secured to the body portion by screws 22 or the like. The body portion is provided with depending bosses 23 which are internally threaded so that the valve assembly can be secured to a suitable support. Between the bosses, the body portion 20 is provided with diametrically opposed ports 11a, 15a, 13a and 14a, which are connected to the conduits 11, 15, 13 and 14, respectively. The port 11a is of a smaller diameter than that of the remaining ports and is, as indicated above, connected to the conduit 11 through which fluid under pressure issues from the pump 12 so that pressure on the low pressure side of the piston will be relieved faster than the pressure will be built up on the high pressure side of the piston, thus facilitating the rapid shifting of the piston. The ports extend upwardly through passages in the valve body portion 20 and open at the face of the body portion 20, as shown in Figure 4.

A sealing gasket 24 is disposed between the cap or housing 21 and the body portion 20 to prevent leakage of fluid. The cap is provided with an upstanding cylindrical portion 25 through which a valve operating stem 26 extends. A fluid seal is provided around the stem 26 by a packing 27 and a follower 28 which is maintained in position by a locking cap 29 threadedly engaging the cylindrical portion 25. The cap 29 may be locked in position by a locking arm 30 which is pivoted to the housing, as at 31. An annular plate 32 is secured by pins 33, or the like, to the inner face of the upper wall of the housing 21. The annular plate is provided with a radial projection 34 which extends between lugs 35 depending from the upper wall of the housing 21 so that the plate 32 may be properly positioned in the housing. A portion 36 of the plate 32 is offset so as to provide inclined cam surfaces 37, 38.

The valve stem 26 is provided with an enlarged portion 39, disposed within the housing 21. The lower end 26a of the valve stem extends into a recess 20a in the body portion 20 and the lower end of the enlarged portion 39 abuts against the valve member 19. There is an aperture 40 extending radially through the enlarged portion 39 of the stem 26 above the valve member 19. A pin 41 extends across the aperture 40 and projects on opposite sides thereof. A lever 42 extends through the aperture 40 and is pivotally mounted on the pin 41. The lever 42 is provided with a pivoted valve shoe 43 at one end thereof and with an upwardly projecting shoulder 44 at the opposite end thereof. A spring 44a is secured to the pin 41 and operates against the lever 42 to normally urge the end to which the valve shoe 43 is pivoted downwardly.

The valve member 19 is provided with arcuate channels 45, 46 on the under side thereof. These channels are diametrically opposed to one another and the channel 45 is larger than the channel 46 which is in communication with the smaller part 11a and is adapted to always communicate with the discharge conduit 13. The channels 45, 46 are of sufficient length to connect a pair of ports in the valve body and the valve member 19 is limited in its movement in opposite directions by means of a stop pin 47 which extends through the housing and cooperates with a pair of upstanding spaced lugs 48, 49, at the outer edge of the valve member 19. When the valve member 19 is in the position shown in Fig. 2, the channel 46 affords communication between the conduits 11 and 15 and the channel 45 affords communication between the conduits 13, 14. This position of the valve member is shown in Fig. 1. When the valve member is shifted to its opposite extreme position, that is, with the stop pin 47 abutting against the lug 48, the channel 45 will afford communication between the conduits 13 and 15 and the channel 46 will afford communication between the conduits 11 and 14, thus directing the fluid under pressure to the opposite end of the cylinder 16. A suitable operating handle (not shown) may be provided on the valve stem 26 so as to operate the valve member 19 through an angle of substantially 80°, that is, between the stop lugs 48, 49.

The valve member 19 is also provided adjacent the valve stem 26 with diametrically opposed pairs of upstanding lugs 50, 51. The projecting ends of the pin 41 are disposed in the spaces 50a, 51a between the lugs 50, 51 respectively. As shown in Fig. 2, turning of the stem 26 will shift the pin 41 in the spaces 50a, 51a, without turning the valve member 19. Thus, there is a certain amount of lost motion in the turning of the stem 26 before the pin 41 engages the lugs 50, 51 to rotate the valve member 19. The valve member 19 is provided with ports 52, 53, through the upper surface thereof. The port 52 affords communication between the channel 45 and the space above the valve member while the port 53 affords communication between the channel 46 and the space above the valve member. The valve shoe 43 is adapted to control the port 52 in the manner to be presently described.

The center of the offset portion 36 of the plate 32 is disposed approximately ninety degrees from the stop pin 47 with respect to the axis of the valve stem 26. In assembling the valve, the stem 26 carrying the lever 42 is positioned in the housing 21 and the valve member 19 is then positioned on the stem 26 so that the stop pin 47 is disposed between the lugs 48 and 49 thereon. When assembled in this manner, the shoulder 44 on one end of the lever 42 will pass over the offset portion 36 of the plate 32 and the cam surfaces 37, 38 during the full movement of the valve member 19. The valve member is moved in either direction by engagement of the ends of the pin 41 with the lugs 50, 51, as the stem is turned. The valve member 19 is limited to substantially ninety degrees of movement by the stop pin 47 and lugs 48 and 49.

When the valve member is in one extreme position with the lug 49 abutting against the pin 47, as in Fig. 2, the channel 46 affords communication between the ports 11a, 15a, so that fluid under pressure will flow from the conduit 11 through the channel 46 and the conduit 15 into the right end of the cylinder 16, thus forcing the piston 17 to the left, as viewed in Fig. 1. The channel 45 affords communication between the ports 14a, 13a so that fluid is exhausted by the piston into the conduit 14, through the channel 45 and back to the pump 12 through the conduit 13. In this position of the valve member 19, the shoulder 44 on the lever 42 is off the offset portion 36 of the plate 32, as shown in Fig. 6, so that the spring 44a forces the opposite end of the lever 42 downwardly whereby the valve shoe 43 closes the port 52 in the valve member. The fluid under pressure may thus pass from the channel 46 through the port 53 to the space above the valve member. The area of the top of the valve disk 19 is larger than the surface area of the channel 46 in the valve disk, so that the pressure exerted by the fluid against the top of the valve disk is greater than the pressure exerted by the fluid against the surface of the channel 46. Thus, the pressure tending to lift the valve disk from its seat is overcome by the pressure of the fluid against the top of the valve disk so that it is maintained tightly seated. In this manner, the fluid under pressure serves to maintain the valve member tightly seated and, at the same time, is prevented from leaking across the valve member into the low pressure side of the fluid system.

When it is desired to shift the valve member 19, the stem 26 is turned in a clockwise direction, as in Fig. 2, and the pin 41 will be turned therewith. However, the pin does not effect movement of the valve member 19 until the ends thereof pass through the spaces 50a, 51a before abutting against the cooperating lugs 50, 51. This lost motion of the stem 26 moves the lever 42 so that the shoulder 44 thereon rides over the cam surfaces 38, thus raising the valve shoe 43 against the action of the spring 44a to open the port 52. The fluid under pressure is now bypassed through the channel 45 into the return conduit 13, so as to relieve the pressure above the valve member and permit the easy turning thereof. During further movement of the valve member 19, the shoulder 44 contacts with the offset portion 36 on the annular plate 32 so that the fluid under pressure is constantly by-passed from the conduit 11 through the valve housing to the exhaust or return conduit 13. This bypassing of the fluid under pressure permits a balancing of pressures on the opposite sides of the piston 17 in the cylinder 16, so that the piston will remain in the position to which it has been moved.

When the valve member has reached the opposite limit of movement, that is, with the lug 48 abutting against the stop pin 47, the shoulder 44 on the lever 42 will pass over the cam surface 37 and the spring 44a will again force the valve shoe 43 downwardly to close the port 52, thus preventing further by-passing of the fluid under pressure. In this position of the valve member 19, the channel 46 will afford communication between the conduits 11 and 14 and the channel 45 will afford communication between the conduits 15 and 13 so that the fluid under pressure is directed from the high pressure conduit 11 to the opposite end of the cylinder 16, thus reversing the direction of movement of the piston 17.

Assuming the piston 17 to be at the right-hand end (Fig. 1) of its stroke, the operator may turn the valve member 19 to the position shown in Fig. 2, with the lug 49 abutting against the stop pin 47. In this position, the channel 46 affords communication between the conduits 11 and 15 and the channel 45 affords communication between the conduits 13 and 14. The ends of the pivot pin 41 are in the position shown in Fig. 2 so that the shoulder 44 on the lever 42 is off the cam face 37, as shown in full lines in Fig. 6. Thus, the spring 44a maintains the valve shoe 43 seated to close the port 52. The fluid under pressure now flows from the pump 12 into the right end of the cylinder 16, thus tending to move the piston 17 toward the left. The fluid under pressure also flows through the port 53 to the space above the valve member 19, but is prevented from passing into the low pressure side of the system so that the pressure of the fluid tends to maintain the valve member 19 seated.

The operator may shift the valve stem 26 to an extent sufficient to cause the shoulder 44 to ride over the cam face 37 without moving the valve member 19 by the lost motion permitted by the spaces 50a, 51a, through which the ends of the pin 41 must move before engaging opposite pairs of lugs 50, 51. When the shoulder 44 rides over the cam face 37, the valve shoe 43 is raised against the action of the spring 44a, thus opening the port 52 and permitting the fluid under pressure to be released from above the valve member 19 and to be bypassed into the return conduit 13. Thus, the fluid pressure on opposite sides of the piston 17 is balanced so that the piston may be maintained in the intermediate position to which it was previously moved.

The operator may reverse the direction of movement of the piston 17 from this intermediate position by shifting the valve member 19 to its opposite extreme position, that is, with the lug 48 abutting against the stop pin 47. Movement of the valve member is caused by engagement of the ends of the pin 41 with the opposite pairs of lugs 50, 51. While the valve member 19 is being moved to the opposite extreme position, the shoulder 44 rides on the offset portion 36 of the plate 32 so that the port 52 remains open permitting the fluid under pressure to be bypassed across the top of the valve member. When the limit of movement of the valve member 19 is reached, the shoulder 44 rides off the cam face 38, so that the valve shoe 43 is seated to close the port 52. In this position of the valve member 19, the channel 45 affords communication between the conduits 13 and 15, and the channel 46 affords communication between the conduits 11 and 14, so that the fluid under pressure is directed to the opposite end of the cylinder 16 and tends to move the piston 17 to the right (Fig. 1).

Slight movement of the valve stem 26 in a reverse direction will cause the shoulder 44 to ride on the cam face 38, thus bypassing the fluid under pressure across the valve member and balancing pressures on opposite sides of the piston 17. It will be readily seen from the foregoing description that the piston 17 can be moved the entire length of its stroke by moving the valve member 19 and stem 26 from one extreme position to another and that small increments of movement in either direction can be imparted to the piston by proper manipulation of the valve stem 26 and the valve member. The piston can be moved rapidly or relatively slowly, depending upon the position of the shoulder 44 and the resultant degree to which the valve shoe 43 is opened. Thus, the present invention affords an efficient valve mechanism for accurately controlling the operation of a remotely situated device.

It is to be clearly understood that various changes in the details of construction and arrangement of parts may be made without departing from the scope of the invention as set forth in the appended claims.

Having thus described the invention, what I claim as new and desire to secure by Letters Patent, is—

1. A valve assembly comprising a valve casing having a plurality of ports, a valve member mounted in said valve casing and adapted to selectively control the passage of fluid through said ports, a valve stem for shifting said valve member, said valve member having channels adapted to afford communication between pairs of said ports and having apertures affording communication between said channels whereby the fluid under pressure may be bypassed across said valve member, and means controlled by the movement of said valve stem for closing communication between said channels whereby the fluid under pressure may be utilized to exert a seating pressure against said valve member.

2. A valve assembly comprising a valve casing having a plurality of ports, a valve member mounted in said casing and adapted to selectively control the passage of fluid through said ports, means providing a bypass for fluid across said valve member, a valve operating stem, means connecting said stem and said valve member and permitting limited movement of said stem relative to said valve member, a control valve pivotally connected to said stem and operating to control the fluid bypass across said valve member, cam means for maintaining said control valve open during movement of said valve member whereby to facilitate the shifting thereof by permitting the fluid to bypass, and spring means for closing said control valve when the valve member is at the limits of its movement whereby the fluid bypass is closed and the fluid will exert a seating pressure on the said valve member.

3. A valve assembly comprising a valve casing having a plurality of ports, a valve disc mounted in said casing and adapted to selectively control the passage of fluid through said ports, a pair of upstanding lugs on said valve disc, a valve operating stem carrying a pin extending between said lugs and operating to shift said valve disc by engagement with one or the other of said lugs, said lugs being spaced apart a sufficient distance to permit limited movement of said stem relative to said valve disc, means providing a bypass for fluid across the top of said valve disc, and a control valve carried by said stem and operating to close the fluid bypass when said valve disc is at the limits of its movement and initially opened by movement of said stem relative to said valve disc to permit bypassing of the fluid before the valve disc is shifted.

4. A valve assembly comprising a valve casing having a plurality of ports, a valve disc mounted in said casing and adapted to selectively control the passage of fluid through said ports, means providing a bypass for fluid across the top of said valve disc, a valve operating stem, means connecting said stem with said valve disc and permitting limited movement of said stem relative to said valve disc, a lever pivoted intermediate the ends thereof to said stem, a valve carried at one end of said lever for controlling the fluid bypass across said valve disc, spring means for normally forming said valve into position to close the fluid bypass whereby the fluid will exert a seating pressure on said valve disc, and cam means on said casing cooperating with the opposite end of said lever for opening said valve during movement of said stem relative to said valve disc when the valve disc is at the limits of its movement and maintaining said valve open during shifting of said valve disc whereby to facilitate the shifting thereof by bypassing the fluid.

5. A valve assembly for controlling the passage of fluid under pressure to opposite ends of a cylinder in which a piston is reciprocable under the action of fluid pressure, comprising a valve casing having a plurality of ports connected to a fluid pressure system, a valve member mounted in said casing, a valve stem operatively connected to said valve member for shifting the said valve member to selectively control the passage of fluid through said ports to opposite ends of the piston cylinder, means providing a bypass for fluid across said valve member, a control valve for the fluid bypass normally closed to prevent bypassing of the fluid whereby the fluid will exert a seating pressure on said valve member when at the limits of its movement, and means operable upon movement of said stem to open said control valve to bypass the fluid whereby to facilitate shifting of the valve member and to balance the pressure on opposite sides of the piston.

6. A valve assembly for controlling the passage of fluid under pressure to opposite ends of a cylinder in which a piston is reciprocable under the action of fluid pressure, comprising a valve casing having a plurality of ports connected to a fluid pressure system, a valve member mounted in said casing and adapted to selectively control the passage of fluid through said ports to opposite ends of the piston cylinder, a valve operating stem, means connecting said stem with said valve member and permitting limited movement of said stem relative to said valve member, means providing a bypass for fluid across said valve member, a control valve for the fluid bypass normally closed when said valve member is at the limits of its movement whereby to prevent bypassing of the fluid so that the fluid will exert a seating pressure on the valve member, and means for initially opening said control valve upon movement of said stem relative to said valve member to permit bypassing of the fluid whereby to facilitate shifting of the valve member and to balance the pressure on opposite sides of the piston.

7. A valve assembly for controlling the passage of fluid under pressure, comprising a valve casing having a seat provided with a plurality of ports therethrough, a rotatable valve member mounted within said casing for cooperation with said seat to control the passage of fluid through said ports, means for directing fluid under pressure into contact with said valve member whereby the fluid will exert a seating pressure thereon, conduit means for bypassing the fluid under pressure through said valve member into the low pressure line whereby to relieve the seating pressure on said valve member in order to facilitate the shifting thereof, and valve means rotatable upon rotation of said valve member in unison therewith and operable independently thereof for controlling said conduit means.

8. A valve assembly for controlling the passage of fluid under pressure, comprising a valve casing having a plurality of ports therethrough, a valve member mounted in said casing and adapted to selectively control the passage of fluid through said ports, means providing a bypass for the fluid under pressure across said valve member, a valve for controlling the bypass across said valve member, and control means connected to said bypass valve and cooperating with said valve casing for opening the bypass when said valve member is shifted from one extreme position to the other and operating to close the bypass when said valve member is in one of its extreme positions whereby to utilize the fluid under pressure for exerting a seating pressure against the said valve member.

9. A valve assembly comprising a valve casing having a plurality of ports therethrough, a valve member mounted in said valve casing and adapted to selectively control the passage of fluid through said ports, said valve member having channels adapted to afford communication between pairs of said ports and having apertures affording communication between said channels whereby the fluid under pressure may be bypassed across said valve member to facilitate the shifting thereof, an auxiliary valve for closing communication between said channels when the valve member is at the limits of its movement whereby the fluid under pressure is utilized to exert a seating pressure against the valve member, and control means for opening said auxiliary valve when the valve member is shifted from its extreme positions whereby to facilitate the shifting thereof.

10. A valve assembly for controlling the passage of fluid under pressure, comprising a valve casing having a plurality of ports therethrough, a valve member mounted in said casing and adapted to selectively control the passage of fluid through said ports, a valve operating stem, means for directing fluid under pressure against said valve member whereby the pressure of fluid will exert a seating pressure thereon, means providing a bypass for the fluid under pressure whereby to relieve the seating pressure on the valve member, valve means for controlling the fluid bypass, and means extending through said valve operating stem for operating said valve means.

11. A valve assembly for controlling the passage of fluid under pressure, comprising a valve casing having a seat provided with a plurality of ports, a main valve member rotatable within said casing for selectively controlling the passage of fluid through said ports, a stem extending into said valve casing for operating said main valve member, means providing a bypass for fluid under pressure through said main valve member, and an auxiliary valve disposed within said valve casing and cooperating with said main valve member for controlling the bypass therethrough.

12. A valve assembly for controlling the passage of fluid under pressure, comprising a valve casing having a seat provided with a plurality of ports, a main valve member rotatable within said casing for selectively controlling the passage of fluid through said ports, a stem extending into said valve casing for operating said main valve member, means providing a bypass for fluid under pressure through said main valve member, an auxiliary valve for controlling the passage of fluid through said main valve member, and a lever pivotally connected to said stem for operating said auxiliary valve.

13. A valve assembly for controlling the passage of fluid under pressure, comprising a valve casing having a seat provided with a plurality of ports, a main valve member rotatable within said casing for selectively controlling the passage of fluid through said ports, a stem extending into said valve casing for operating said main valve member, means providing a bypass for fluid under pressure through said main valve member, an auxiliary valve for controlling the passage of fluid through said main valve member, a lever pivotally connected intermediate the ends thereof to said stem and pivotally connected at one end thereof to said auxiliary valve for operating the same, and cam means associated with said casing and cooperating with the free end of said lever for effecting operation thereof.

14. A valve assembly for controlling the passage of fluid under pressure, comprising a valve casing having a seat provided with a plurality of ports, a main valve member rotatably mounted within said casing with one face thereof in contact with said seat for selectively controlling the passage of fluid through pairs of said ports, a stem extending into said valve casing for operating said main valve member, means for directing fluid under pressure into contact with the opposite face of said valve member for exerting a seating pressure thereon, means providing a bypass for the fluid under pressure whereby to relieve the seating pressure and to facilitate shifting of the main valve member, and an auxiliary valve carried by said stem and cooperating with said main valve member for controlling the bypass for the fluid under pressure.

15. A valve assembly for controlling the passage of fluid under pressure, comprising a valve casing having a seat provided with a plurality of ports, a main valve member rotatably mounted within said casing with one face thereof in contact with said seat for selectively controlling the passage of fluid through pairs of said ports, a stem extending into said valve casing for operating said main valve member, means for directing fluid under pressure into contact with the opposite face of said main valve member for exerting a seating pressure thereon, means providing a bypass for the fluid under pressure whereby to relieve the seating pressure and to facilitate shifting of the main valve member, means connecting said stem with said main valve member for permitting limited rotary movement of the stem independent of rotation of the main valve member, and auxiliary valve means carried by said stem and rotatable therewith for controlling the bypass for the fluid under pressure.

16. A valve assembly for controlling the passage of fluid under pressure, comprising a valve casing having a seat provided with a plurality of ports, a main valve member rotatably mounted within said casing with one face thereof in contact with said seat for selectively controlling the passage of fluid through pairs of said ports, a stem extending into said valve casing for operating said main valve member, means for directing fluid under pressure into contact with the opposite face of said main valve member for exerting a seating pressure thereon, means providing a bypass for the fluid under pressure whereby to relieve the seating pressure and to facilitate shifting of the main valve member, means connecting said stem with said main valve member for permitting limited rotary movement of the stem independent of rotation of the main valve member, and auxiliary valve means carried by and rotatable with said stem and capable of vertical movement with respect to said main valve member for controlling the bypass for the fluid under pressure.

17. A valve assembly for controlling the passage of fluid under pressure, comprising a valve casing having a seat provided with a plurality of ports, a main valve member rotatably mounted within said casing with one face thereof in contact with said seat for selectively controlling the passage of fluid through pairs of said ports, a stem extending into said valve casing for operating said main valve member, means for directing fluid under pressure into contact with the opposite face of said main valve member for exerting a seating pressure thereon, means providing a bypass for the fluid under pressure whereby to relieve the seating pressure and to facilitate shifting of the main valve member, means connecting said stem with said main valve member for permitting limited rotary movement of the stem independent of rotation of the main valve member, auxiliary valve means carried by and rotatable with said stem and capable of vertical movement with respect to said main valve member for controlling the bypass for the fluid under pressure, and cam means associated with said valve casing for effecting the desired vertical movement of said auxiliary valve means relative to the main valve member.

ARTHUR L. PARKER.